US010767343B2

(12) United States Patent
Chioccola (10) Patent No.: US 10,767,343 B2
(45) Date of Patent: Sep. 8, 2020

(54) WORK MACHINE COMPRISING A HYDRAULIC ARRANGEMENT FOR A SELECTION VALVE

(71) Applicant: CNH Industrial America LLC, New Holland, PA (US)

(72) Inventor: Francesco Chioccola, Settimo Torinese (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/365,635

(22) Filed: Mar. 26, 2019

(65) Prior Publication Data
US 2019/0292749 A1    Sep. 26, 2019

(30) Foreign Application Priority Data

Mar. 26, 2018   (IT) .................. 102018000003950

(51) Int. Cl.
| | | |
|---|---|---|
| *E02F 9/00* | (2006.01) | |
| *E02F 3/32* | (2006.01) | |
| *E02F 9/22* | (2006.01) | |
| *E02F 9/02* | (2006.01) | |
| *B60B 35/10* | (2006.01) | |
| *E02F 3/815* | (2006.01) | |

(52) U.S. Cl.
CPC .......... *E02F 9/006* (2013.01); *B60B 35/1054* (2013.01); *E02F 3/325* (2013.01); *E02F 9/024* (2013.01); *E02F 9/2275* (2013.01); *B60Y 2200/41* (2013.01); *E02F 3/815* (2013.01)

(58) Field of Classification Search
CPC ......... E02F 3/325; E02F 9/006; E02F 9/2275; E02F 9/024; B60B 35/1054
See application file for complete search history.

(56) References Cited

U.S. PATENT DOCUMENTS

2009/0044434 A1\*  2/2009  Breuer .................. E02F 3/7613
                                                       37/410

FOREIGN PATENT DOCUMENTS

| JP | 3330683 A | 1/1993 | |
|---|---|---|---|
| JP | H05331877 A | 12/1993 | |
| JP | 5331877 B2 \* | 10/2013 | ........... F02D 41/401 |

OTHER PUBLICATIONS

Extended European Search Report for EP application 19163653.9, dated Aug. 20, 2019 (7 pages).

\* cited by examiner

*Primary Examiner* — Abiy Teka
(74) *Attorney, Agent, or Firm* — Patrick Sheldrake; Peter Zacharias (57) ABSTRACT

A work machine including a machine base mounted movably over an undercarriage, and a hydraulic arrangement which includes a first cylinder configured for operating a working blade of the work machine, a second cylinder configured to vary the width of the undercarriage, a source of fluid at high pressure which is fluidly connected to the first and second cylinders and which is housed in the machine base, and a selection valve which is fluidly interposed between the source and at least one of the first and second cylinders. The valve is housed in the undercarriage.

11 Claims, 7 Drawing Sheets

FIG. 9

WORK MACHINE COMPRISING A HYDRAULIC ARRANGEMENT FOR A SELECTION VALVE

TECHNICAL FIELD

The present invention concerns a work machine comprising a hydraulic arrangement for a selection valve, in particular a work machine comprising a hydraulic arrangement for controlling a selection valve configured to vary the width of the undercarriage and the operation of a work blade of the work machine.

BACKGROUND OF THE INVENTION

Mini-excavator is a work machine having a relative small weight (e.g. less than 1.8 tons) and voted to earth moving.

Mini-excavator essentially comprises a machine base rotatably mounted on an undercarriage movable thanks to moving means, e.g. track bands, and a work blade, also known as dozer, pivotally carried by a boom which is pivoted with respect to the machine base.

Width of undercarriage may be varied in function of the space through which the mini-excavator must pass. Indeed, in certain situation undercarriage should be retracted to a minimum width, e.g. during the passage in a narrow space, or should be extended to a maximum width, e.g. when a great stability is needed. Dozer may be controlled by controlling the operation boom.

The above described operation of undercarriage and dozer are hydraulically operated thanks to an hydraulic arrangement essentially comprising a hydraulic cylinder configured to operate the dozer, a hydraulic cylinder configured to vary the width of the undercarriage and a selection valve configured to switch the passage of operating fluid so as to control only one of the two aforementioned cylinders.

Such selection valve is placed in the machine base and therefore at least four hoses (two per cylinder), suitable for the passage of high pressure fluid, have to be provided between selection valve and cylinders. Such hoses may be subject to loads and wear due to their long path from valve to cylinders.

Moreover hoses have to pass through a swivel joint which connects machine base to the undercarriage and allows the relative motion of machine base with respect to undercarriage. Therefore, swivel joint needs to be dimensioned to allow the passage of at least such four hoses, therefore increasing its costs and dimensions.

In view of the above, the need is felt to reduce the number of hoses passing through the swivel joint of a mini-excavator for controlling the hydraulic cylinders which control the dozer and the width of the undercarriage. Moreover, the need is felt to simplify the control of the two aforementioned cylinders in an economic way.

An aim of the present invention is to satisfy the above mentioned needs.

SUMMARY OF THE INVENTION

The aforementioned aim is reached by a work machine comprising a hydraulic arrangement as claimed in the appended set of claims.

BRIEF DESCRIPTION OF DRAWINGS

For a better understanding of the present invention, a preferred embodiment is described in the following, by way of a non-limiting example, with reference to the attached drawings wherein.

DETAILED DESCRIPTION OF THE INVENTION

Figure 1A:
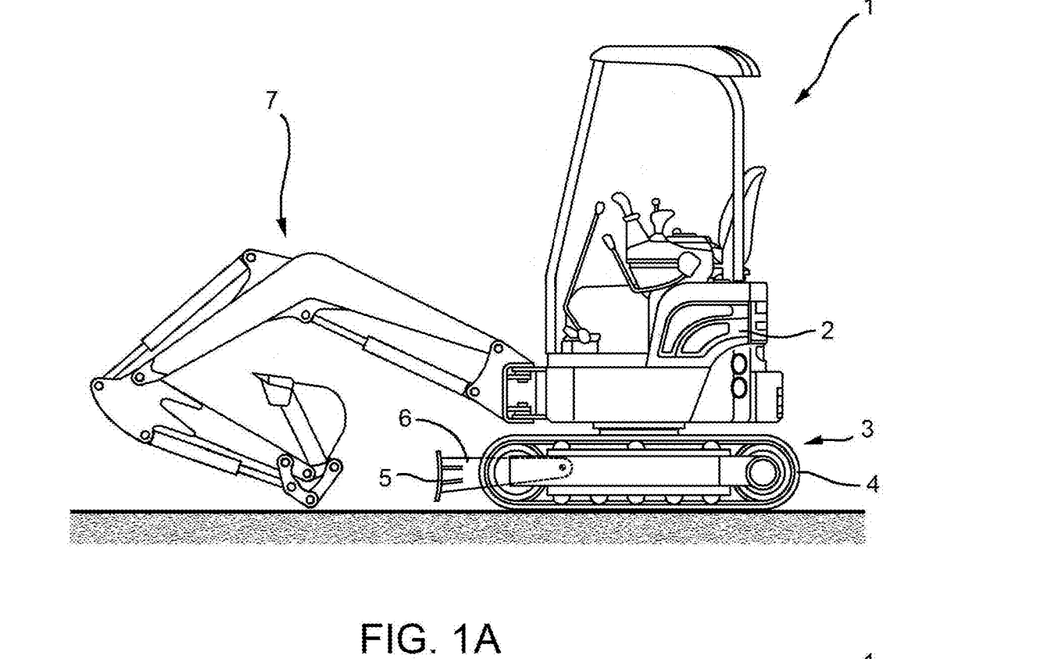
FIG. 1a is a lateral schematic view of a known type mini-excavator in a first operative condition.
Figure 2:
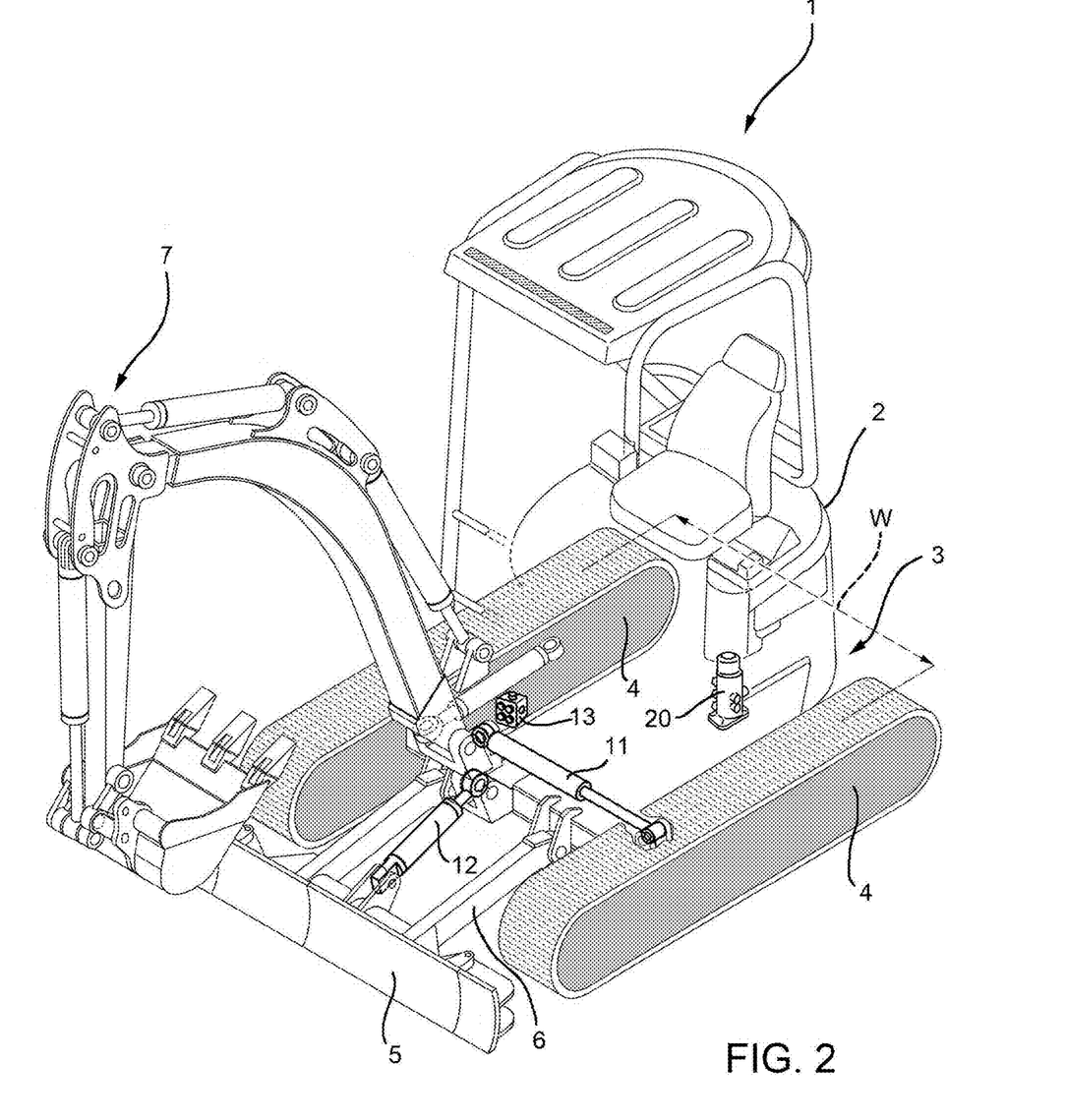
FIG. 2 is a perspective view, with parts removed for sake of clarity, of a mini-excavator comprising a hydraulic arrangement as known in the prior art.

FIGS. 1a and 2 discloses a work machine, i.e. a mini-excavator 1, comprising a machine base 2 rotatably mounted on an undercarriage 3 movable thanks to moving means, e.g. track bands 4, and a work blade, also known as dozer 5, pivotally carried by a boom 6 which is pivoted with respect to the machine base 2. Mini-excavator 1 further comprises a working element 7, e.g. a bucket carried by a hydraulically actuated boom, connected to machine base 2.

Mini-excavator 1 comprises a hydraulic arrangement (not shown in detail in FIGS. 1a and 2 but schematically represented in FIG. 3) configured to operate a first hydraulic actuator 11 voted to vary a width W of undercarriage defined by moving means, i.e. by track bands 4, and a second hydraulic actuator 12 voted to move boom 6 and consequently dozer 5.

Figure 3:
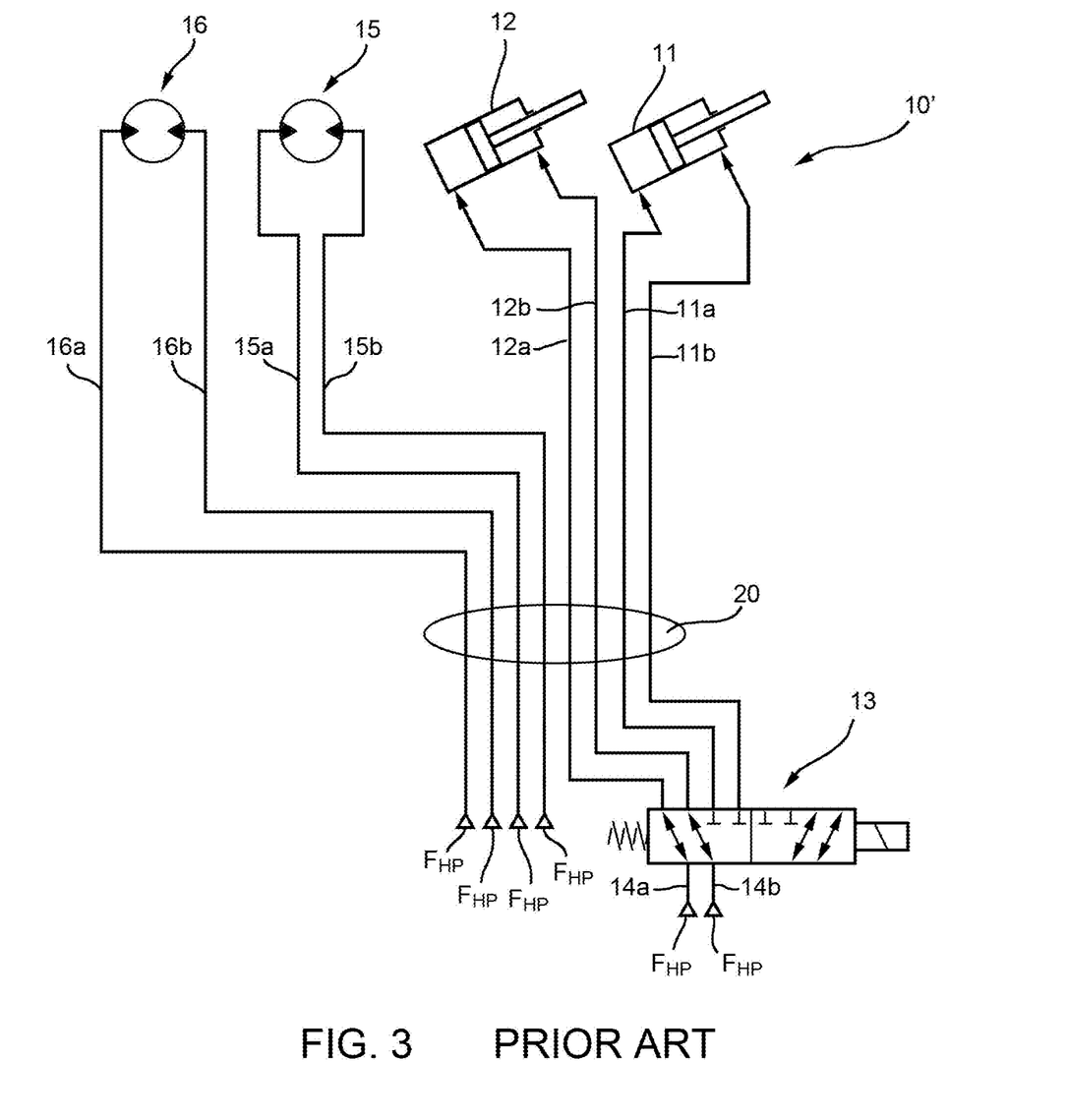
FIG. 3 is a scheme of the hydraulic arrangement for controlling dozer and undercarriage width-control cylinders as known in the prior art.

Hydraulic arrangement 10' as known in the prior art comprises a selection valve 13 configured to allow the passage of high pressure fluid from a source of fluid in pressure $F_{HP}$ of hydraulic arrangement 10' in only one of cylinders 11, 12. Respective hoses 11a, 11b and 12a, 1b fluidly connect selection valve 13 with respective openings of cylinders 11 and 12 and hoses 14a, 14b fluidly connect valve 13 to the high pressure fluid source $F_{HP}$. Selection valve 13 is controlled by a pilot line which is configured to switch valve 13 so as to assume at least two operational positions. Pilot line may be a hydraulic pilot line or an electrically pilot line as known in the art.

Hydraulic arrangement 10' may moreover comprise two hydraulic motors, more specifically a left motor 15 and a right motor 16, configured to operate moving means of mini-excavator 1, respectively left and right moving means, i.e. left and right tracks 4. Hydraulic motors 15 and 16 are fed by fluid in high pressure thanks to respective hoses 15a, 15b and 16a, 16b fluidly connecting respecting openings of motors 15 and 16 with the a high pressure fluid source $F_{HP}$.

Hoses 11a, 11b, 12a, 12b, 14a, 14b, 15a, 15b and 16a, 16b are high pressure hoses for operative fluid for oil hydraulic circuit of work machines as known in the art.

Hoses 11a, 11b, 12a, 12b, 15a, 15b and 16a, 16b must pass from machine base 2 to undercarriage 3 through a swivel joint 20 (represented schematically by dot lines) positioned downstream with respect to valve 13 and upstream with respect to cylinders 11, 12 and motors 15, 16.

According to the present invention, hydraulic arrangement 10 comprises a selection valve 13 which is housed in undercarriage 3, i.e. it is positioned downstream with respect to swivel joint 20 and upstream with cylinders 11, 12.

Figure 4:
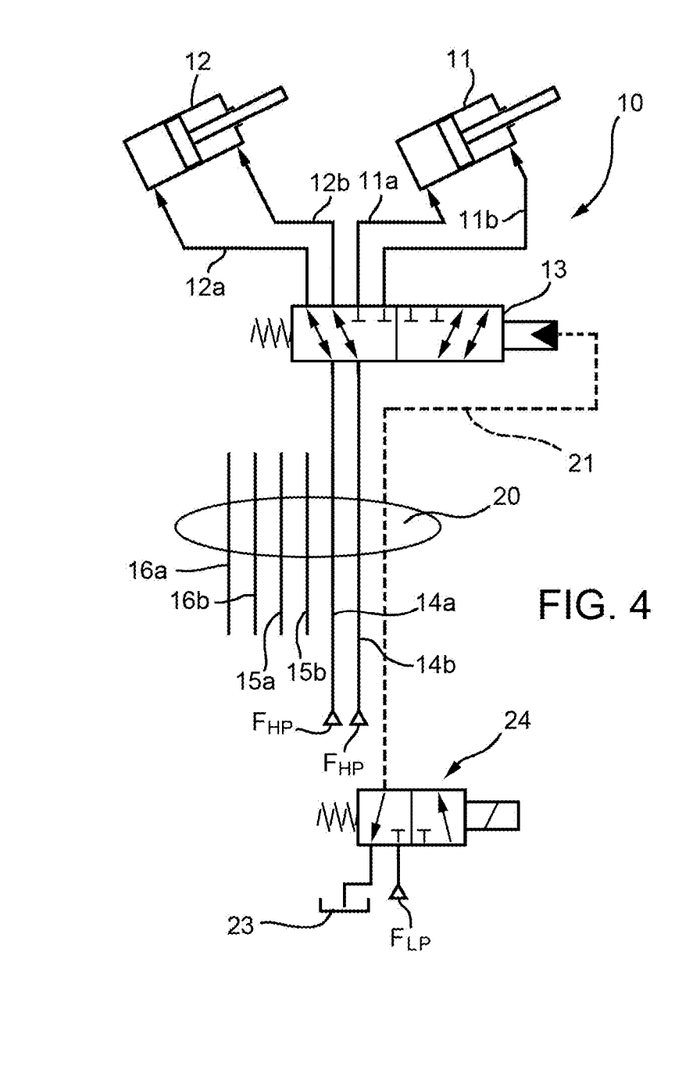
FIG. 4 is a scheme of a hydraulic arrangement for controlling dozer and undercarriage width-control cylinders according to a first embodiment of the present invention.

According to a first embodiment of the present invention, shown in FIG. 4, selection valve 13 is controlled thanks to a hydraulic pilot line 21 which may connected to a low pressure source $F_{LP}$ or to a discharge 23 by a control valve 24.

Figure 5:
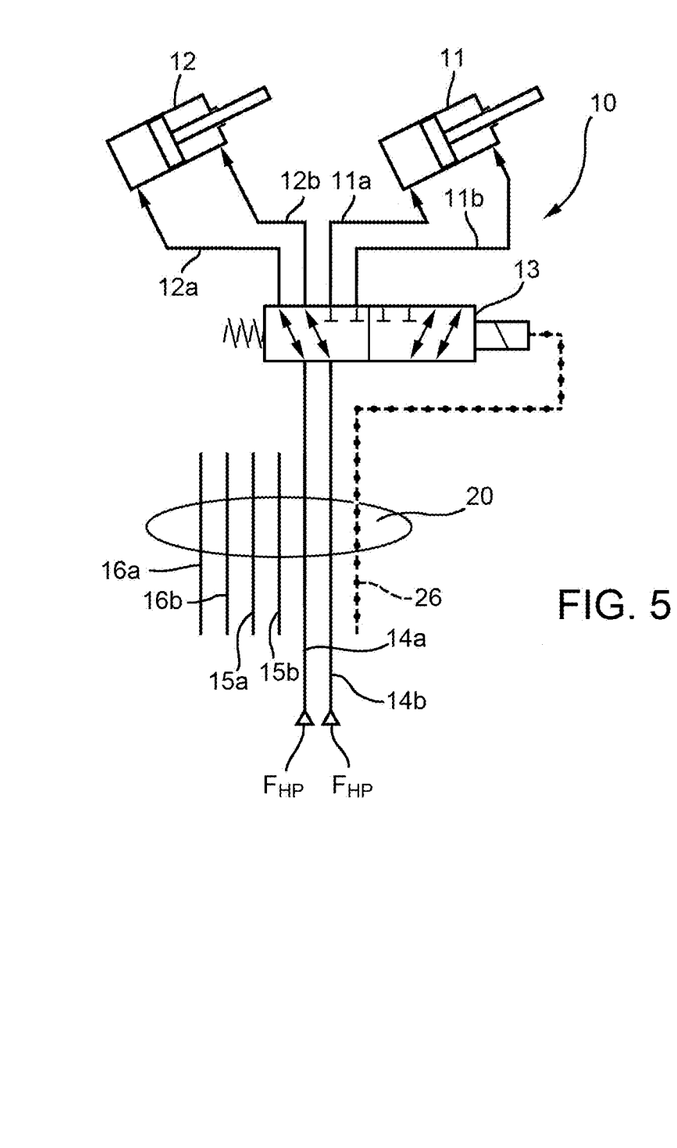
FIG. 5 is a scheme of a hydraulic arrangement for controlling dozer and undercarriage width-control cylinders according to a second embodiment of the present invention.

According to a second embodiment of the present invention, shown in FIG. 5, selection valve 13 is controlled thanks to a electric pilot line 26.

In both embodiments hydraulic pilot line 21 or electric pilot line 26 has to pass through swivel joint 20 from machine base 2 to undercarriage 3.

The operation of hydraulic arrangement 10 according to the two aforementioned embodiments of present invention is the following.

In a first operative configuration selection valve 13 is disposed so that high pressure fluid from hoses 14a, 14b may pass through valve 13 to cylinder 12 to activate dozer 5 (see FIGS. 3 and 4). Valve 13 is controlled by hydraulic pilot line 21 which, according to the embodiment of FIG. 4, may be fluidly connected to discharge by valve 24. According to embodiment of FIG. 5, a proper electronic signal actuate valve 13 in the chosen position.

In a second operative configuration selection valve 13 is disposed so that high pressure fluid from hoses 14a, 14b may pass through valve 13 to cylinder 11 to activate variation of width between tracks 4 (schema not represented). Valve 13 is controlled by hydraulic pilot line 21 which, according to first embodiment, may be fluidly connected to low pressure fluid source through valve 24. The operation of the second embodiment is substantially the same of the above described operation of the first embodiment with the sole difference that a proper electronic signal in pilot line 26 actuate valve 13 in the chosen position instead of a hydraulic signal.

Figure 6:
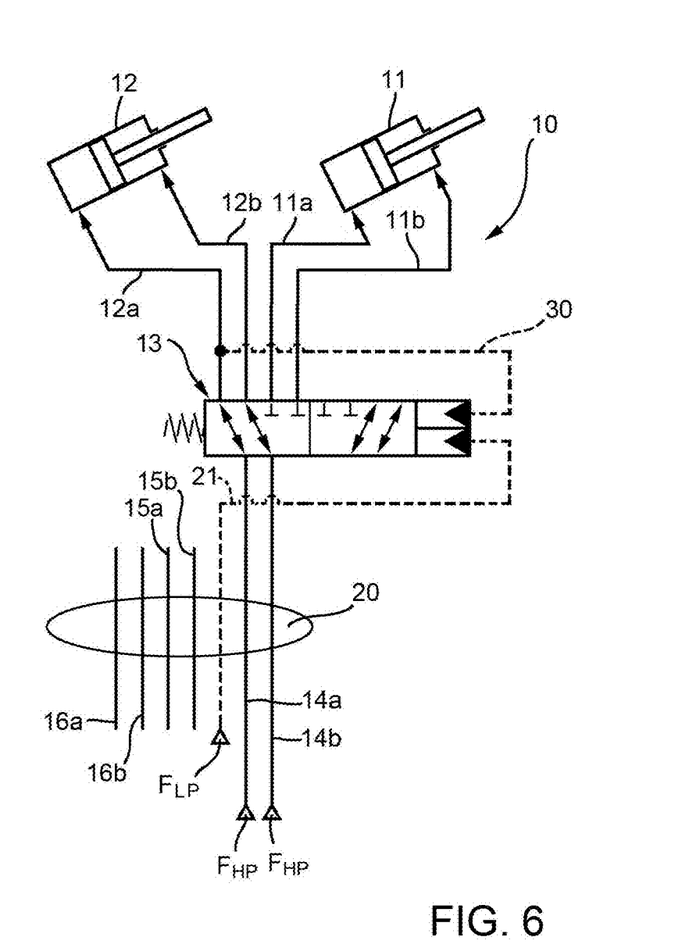
FIG. 6 is a scheme of a hydraulic arrangement for controlling dozer and undercarriage width-control cylinders according to a third embodiment of the present invention.
Figure 7:
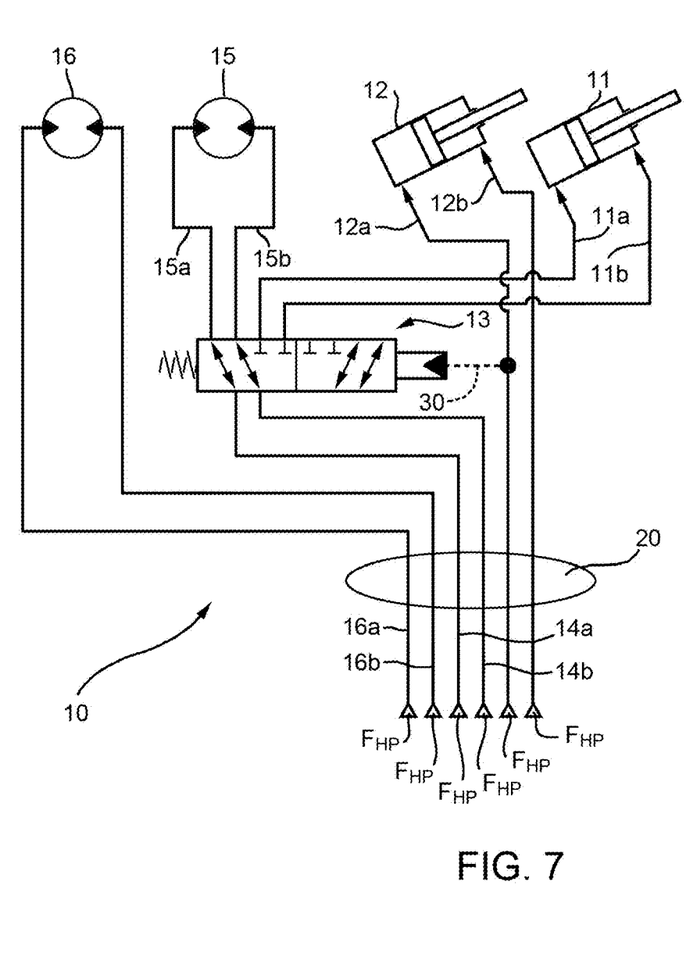
FIGS. 7 and 8 are respective schemes of a hydraulic arrangement for controlling dozer and undercarriage width-control cylinders according to a fourth embodiment of the present invention in two different operative conditions.

According to further aspect of the present invention, shown in FIGS. 5 to 7, selection valve 13 is controlled thanks to a signal given by a feedback line 30 which is entirely housed in said undercarriage 3. In the aforementioned embodiment said signal is an hydraulic signal acquired by the pressure of operative fluid in inlet hose 12a of hydraulic cylinder 12.

As disclosed in a third embodiment of the present invention, shown in FIG. 6, selection valve 13 may be actuated thanks to a hydraulic pilot line 21 which, when actuated by the operator e.g. pushing a specific button, is continuously connected to a low pressure source $F_{LP}$. Selection valve 13 is further fluidly connected to inlet hose 12a of hydraulic cylinder 12 by feedback line 30 configured to allow the fluid in pressure in inlet hose 12a to switch selection valve 13 when such pressure is above a preset threshold. Accordingly, feedback line 30 hydraulic signal and low pressure fluid from pilot line 21 are two "and" condition to activate valve 13.

Figure 1B:
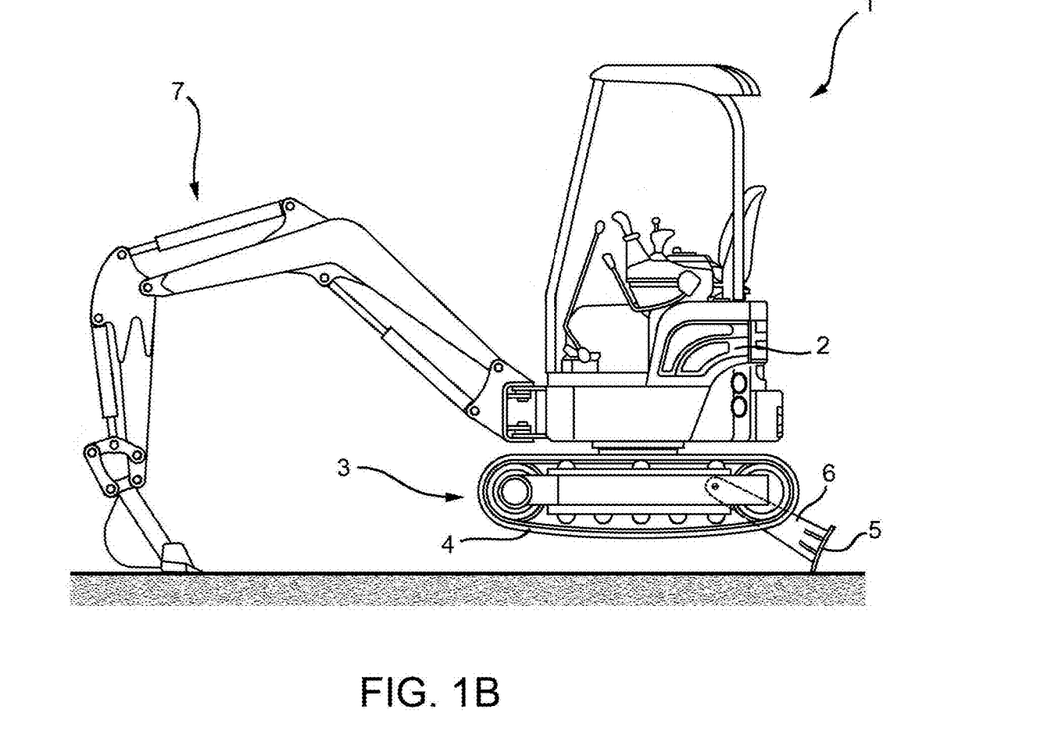
FIG. 1b is a lateral schematic view of a known type mini-excavator in a second operative condition.

The mentioned threshold is the pressure reached by working fluid in hose 12a when machine base 2 is lifted up, e.g. by pushing on the ground dozer 5 and the working element 7, so as to lift up machine base 2 (see FIG. 1b). In such configuration the weight of work machine 1 acts on cylinder of dozer 5 and cylinder 12 must supply a consequent load configured to support such function.

The operation of hydraulic arrangement 10 according to the aforementioned embodiment of present invention is the following.

In a first operative configuration, hydraulic cylinder 12 is used under a preset pressure threshold of working fluid in hose 12a and therefore selection valve 13 stay in a first position in which working fluid at high pressure flows to hydraulic cylinder 12 through valve 13; pilot signal 21 is inhibited to activate displacement of valve 13 by the fluid in hose 12a which pressure is under the preset pressure threshold.

In a second operative configuration (FIG. 1b), user lifts machine base 2 by pushing dozer 5 and working arm 7 of the work machine 1 on the ground. Pressure of working fluid in hose 12a surmount the pressure threshold because cylinder 12 has to support machine weight. Accordingly, pressure of pilot signal 21 allow displacement of valve 13 which changes position and allows the fluidic connection between high pressure fluid source $F_{HP}$ to first cylinder 11. User may therefore vary width W of undercarriage 3. During such phase, since work machine 1 remains in the "lifted" configuration, user may continue to use cylinder 11 because pressure in hose 12a remains constant.

When the desired width W is reached, user will lower machine base 2 and therefore dozer 5 will no more support machine weight. Pressure in hose 12a will therefore decrease under the preset threshold and pilot signal 21 returns to its inhibition state and valves returns in the position according to the described first operation configuration.

Figure 8:
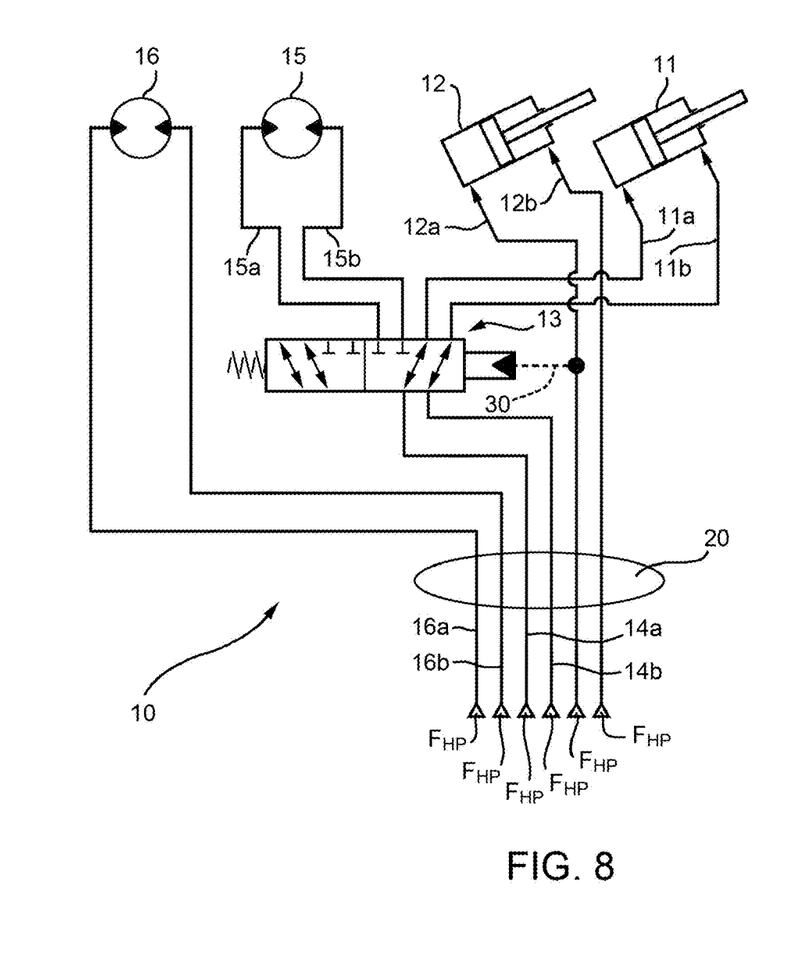

As disclosed in a fourth embodiment of the present invention, shown in FIGS. 7 and 8, selection valve 13 may be fluidly interposed between hydraulic cylinder 11 and at least one between motors 15 or 16, in the described exemplificative configuration only left motor 15, and controlled by hydraulic signal coming from feedback line 30 which fluidly connected inlet hose 12a of hydraulic cylinder 12 to selection valve 13.

In such configuration of hydraulic arrangement 10, hydraulic cylinder 12 is continuously connected to high pressure source $F_{HP}$ by hoses 12a, 12b while left motor 15 and hydraulic cylinder 11 are selectively fluidly connected to high source pressure via hoses 14a, 14b in function of position of valve 13.

In a first operative configuration (FIG. 7), hydraulic cylinder 12 is used under a preset pressure threshold of working fluid in hose 12a and therefore selection valve 13 stay in a first position in which working fluid at high pressure flows from its source to left motor 15 through valve 13.

In a second operative configuration (FIG. 8), user lifts machine base 2 by pushing dozer 5 and working arm 7 of the work machine 1 on the ground. Pressure of working fluid in hose 12a surmount the pressure threshold because cylinder 12 has to support machine weight. Accordingly, such pressure activates displacement of valve 13 which changes position and allows the fluidic connection between high pressure fluid source $F_{HP}$ to first cylinder 11. User may therefore vary width W of undercarriage 3. During such phase, since work machine 1 remains in the "lifted" configuration, user may continue to use cylinder 11 because pressure in hose 12a remains constant.

When the desired width W is reached, user will lower machine base 2 and therefore dozer 5 will no more support machine weight. Pressure in hose 12a will therefore decrease under the preset threshold and selection valve 13 returns to in the position according to the described first operation configuration.

Figure 9:
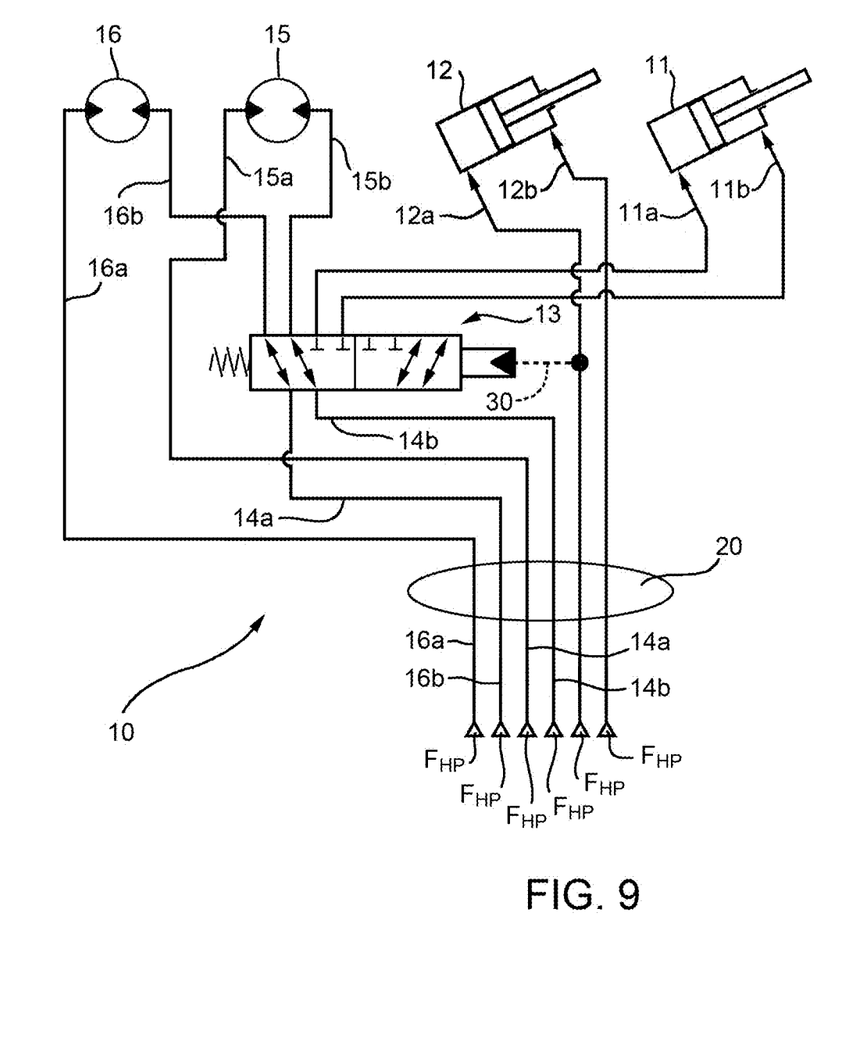
FIG. 9 is a scheme of a hydraulic arrangement for controlling dozer and undercarriage width-control cylinders according to a fifth embodiment of the present invention.

As disclosed in a fifth embodiment of the present invention, shown in FIG. 9, selection valve 13 may be fluidly interposed between hydraulic cylinder 11 and both motors 15 or 16 and controlled by hydraulic signal coming from feedback line 30 which fluidly connected inlet hose 12a of hydraulic cylinder 12 to selection valve 13.

In such configuration of hydraulic arrangement 10, hydraulic cylinder 12 is continuously connected to high pressure source $F_{HP}$ by hoses 12a, 12b while both hoses 15a, 15b and 16a, 16b of respectively left and right motors 15, 16 and hydraulic cylinder 11 are selectively fluidly connected to high source pressure via hoses 14a, 14b in function of position of valve 13.

In the exemplificative shown operative configuration of FIG. 9, hydraulic cylinder 12 is used under a preset pressure threshold of working fluid in hose 12a and therefore selection valve 13 stay in a first position in which working fluid at high pressure flows from its source to left and right motors 15 and 16 through valve 13.

In a second operative configuration (not shown), user lifts machine base 2 by pushing dozer 5 and working arm 7 of the work machine 1 on the ground. Pressure of working fluid in hose 12a surmount the pressure threshold because cylinder 12 has to support machine weight. Accordingly, such pressure activates displacement of valve 13 which changes position with the same effect of the above described fourth embodiment.

In view of the foregoing, the advantages of hydraulic arrangement 10 according to the invention are apparent.

The displacement of selection valve 13 from machine base 2 to undercarriage 3 allows to reduce, of at least two units, the number of hoses which need to pass into swivel joint 20. In this way, swivel joint 20 may be designed smaller and therefore its costs and encumbrance are reduced.

Moreover, since hoses of cylinders 11 and 12 must follow a shorter and simpler path from valve 13 to cylinders 11, 12, risk of wear and damages to such hoses is reduced.

The control of selection valve 13 may be hydraulically or electronically implemented, therefore increasing the versatility of hydraulic arrangement 10.

Further, the control of selection valve 13 thanks to bypass line 30, allows to reduce further the number of hoses which need to pass into swivel joint 20. Such control allows to provide valve 13 between other elements of hydraulic arrangement 10, such as motors 15, 16 of work machine 1.

It has to be noted that according to the embodiments of FIGS. 6 to 8 a cost reduction can be further achieved by eliminating electric and/or hydraulic components configured to control movement of selection valve 13.

It is clear that modifications can be made to the described hydraulic arrangement 10 which do not extend beyond the scope of protection defined by the claims.

For example, it is clear that the actuation of selection valve 13 may be implemented in other way with respect to the described ones.

Moreover, other elements than the described may be present into the hydraulic arrangement 10 of the present invention.

Further, it is clear that feedback line 30 may be also provided as an electrical signal converted from a sensor configured to detect pressure in hose 12a. Selection valve 13 may be interposed with right motor 16 or may be again interposed between the two cylinders 11, 12.

Finally, described embodiments may be combined together without departing from the scope of the appended set of claims.

The invention claimed is:

1. A work machine comprising:
a machine base mounted movably over an undercarriage; and
a hydraulic arrangement comprising:
a first cylinder configured for operating a working blade of the work machine, the working blade connected to the undercarriage,
a second cylinder configured to vary the width of the undercarriage,
a source of fluid at high pressure which is fluidly connected to the first and second cylinders and which is housed in the machine base,
a selection valve which is fluidly interposed between the source and at least one of the first and second cylinders, wherein the valve is housed in the undercarriage, and
a feedback line connected between an inlet hose of the first cylinder and the selection valve, the hydraulic arrangement configured to switch a position of the selection valve automatically when a pressure in the inlet hose of the first cylinder is greater than a threshold such that the undercarriage is in a lifted configuration when the width of the undercarriage is changed by the second cylinder.

2. The work machine according to claim 1, wherein the feedback line is a pilot line configured for fluidly connecting a source of fluid housed in the machine base to the selection valve so as to switch its position.

3. The work machine according to claim 2, wherein the pilot line is a hydraulic feedback line.

4. The work machine according to claim 1, wherein the feedback line is an electrical pilot line suitable for electrically connecting an electrical source housed in the machine base to the selection valve so as to switch its position.

5. The work machine according to claim 1, wherein the feedback line is entirely housed in the undercarriage.

6. A work machine comprising:
a machine base mounted movably over an undercarriage; and
a hydraulic arrangement comprising:
a first cylinder configured for operating a working blade of the work machine,
a second cylinder configured to vary the width of the undercarriage,
a source of fluid at high pressure which is fluidly connected to the first and second cylinders and which is housed in the machine base,
a selection valve which is fluidly interposed between the source and at least one of the first and second cylinders, wherein the valve is housed in the undercarriage, and
a feedback line connected to the selection valve for switching the position of the selection valve,
wherein the feedback line is also connected to an inlet hose of the first cylinder and, wherein the selection valve is configured to switch position when a pressure at the inlet hose is greater than a preset threshold.

7. The work machine according to claim 6, wherein the pressure threshold is the pressure in the inlet hose reached when the work machine is in lifted position.

8. The work machine according to claim 6, wherein the feedback line is a hose fluidly connecting the valve to the inlet hose.

9. The work machine according to claim 6, wherein the valve is fluidly interposed between the source and both the first and second cylinders.

10. The work machine according to claim 6, wherein the valve is fluidly interposed between the source, one between the first and second cylinders and at least one motor of the work machine.

11. The work machine according to claim 6, wherein the valve is fluidly interposed between the source, one between the first and second cylinders and both motors of the work machine.

* * * * *